(12) United States Patent
Oba

(10) Patent No.: US 11,804,797 B2
(45) Date of Patent: Oct. 31, 2023

(54) MOTOR CONTROLLER, MOTOR SYSTEM AND METHOD FOR CONTROLLING MOTOR

(71) Applicant: MINEBEA MITSUMI Inc., Nagano (JP)

(72) Inventor: Takashi Oba, Tochigi (JP)

(73) Assignee: MINEBEA MITSUMI Inc., Nagano (JP)

( * ) Notice: Subject to any disclaimer, the term of this patent is extended or adjusted under 35 U.S.C. 154(b) by 176 days.

(21) Appl. No.: 17/440,295

(22) PCT Filed: Mar. 23, 2020

(86) PCT No.: PCT/JP2020/012680
§ 371 (c)(1),
(2) Date: Sep. 17, 2021

(87) PCT Pub. No.: WO2020/196390
PCT Pub. Date: Oct. 1, 2020

(65) Prior Publication Data
US 2022/0158581 A1 May 19, 2022

(30) Foreign Application Priority Data
Mar. 25, 2019 (JP) .................................. 2019-057289

(51) Int. Cl.
*H02P 27/08* (2006.01)

(52) U.S. Cl.
CPC .................................. *H02P 27/085* (2013.01)

(58) Field of Classification Search
CPC ........ H02P 27/085; H02P 27/10; H02P 27/12; H02P 27/16; H02P 27/18; H02P 27/05

USPC ........................................................... 318/503
See application file for complete search history.

(56) References Cited

U.S. PATENT DOCUMENTS

| 9,203,330 B2 | 12/2015 | Suzuki | |
| 2015/0075195 A1* | 3/2015 | Suzuki | ...................... H02P 6/28 62/157 |
| 2015/0075898 A1 | 3/2015 | Suzuki | |

(Continued)

FOREIGN PATENT DOCUMENTS

| JP | 2008-113494 | 5/2008 | |
| JP | 2011-050248 | 3/2011 | |
| JP | 2013162536 A * | 8/2013 | ............ B60L 15/007 |

(Continued)

OTHER PUBLICATIONS

International Search Report for PCT/JP2020/012680 dated Jun. 23, 2020.

*Primary Examiner* — Kawing Chan
(74) *Attorney, Agent, or Firm* — IPUSA, PLLC

(57) ABSTRACT

A PWM signal generator of a motor controller 100-1 divides, upon occurrence of a condition in which one among a count incrementing period and a count decrementing period for a carrier is greater than or equal to a threshold, in conjunction with a condition in which the other among the count incrementing period and the count decrementing period is less than the threshold, an on time period of any one among a first PWM signal, a second PWM signal, and the third PWM signal into given on time periods and to add a given divided on time period to an energizing time period that is less than the threshold.

3 Claims, 11 Drawing Sheets

(56) References Cited

U.S. PATENT DOCUMENTS

2022/0263449 A1* 8/2022 Oba ................. H02P 27/08

FOREIGN PATENT DOCUMENTS

| JP | 2015-061381 | 3/2015 | | |
|----|----|----|----|----|
| JP | 2015-084632 | 4/2015 | | |
| JP | 2016167945 A | * | 9/2016 | ............. F04B 49/00 |

* cited by examiner

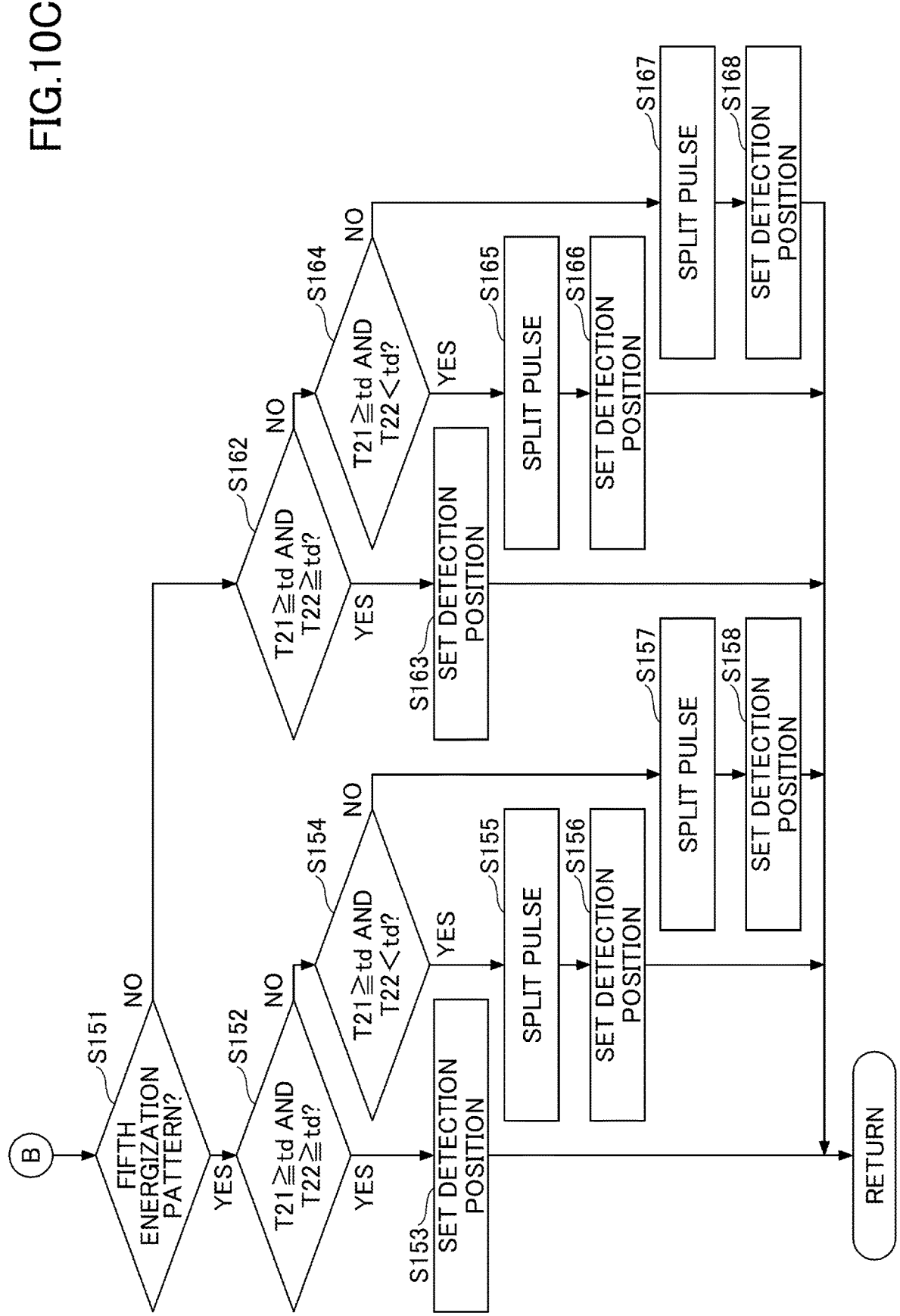

MOTOR CONTROLLER, MOTOR SYSTEM AND METHOD FOR CONTROLLING MOTOR

TECHNICAL FIELD

The present invention relates to a motor controller, a motor system, and a method for controlling a motor.

BACKGROUND

Patent Document 1 discloses a technique in which a shunt resistor inserted in a direct current unit in an inverter circuit is used to detect respective currents for U, V, and W phases, in order to control a motor. In such a system, in order to detect the currents for all of three phases, a three-phase PWM signal pattern needs to be generated such that currents for two or more phases can be detected within one period of a pulse width modulation (PWM) carrier.

CITATION LIST

Patent Document

[Patent Document 1] Japanese Unexamined Patent Application Publication No. 2015-84632

SUMMARY

However, in conventional techniques, there might be cases where phase currents for at least two phases cannot be accurately detected within one period of the carrier.

In view of the point described above, an object of the present invention is to provide a motor controller that can accurately detect phase currents for at least two phases within one period of a carrier.

A motor controller according to an embodiment of the present invention includes an inverter configured to drive a motor based on a first PWM signal, a second PWM signal, and a third PWM signal. The motor controller includes a current detection unit configured to output a detection signal corresponding to a magnitude of a current flowing into a direct current line of the inverter. The motor controller includes a current detector configured to detect a phase current for each phase, by obtaining the detection signal. The motor controller includes a duty-cycle setting unit configured to set a duty cycle of each of the first PWM signal, the second PWM signal, and the third PWM signal, based on a corresponding detected value for a given phase. The motor controller includes a PWM signal generator configured to generate each of the first PWM signal, the second PWM signal, and the third PWM signal, by comparing a setting value of a corresponding duty cycle against a level of a carrier, the level of the carrier increasing or decreasing periodically. The PWM signal generator is configured to split, upon occurrence of a condition in which an energizing time period that is greater than or equal to a threshold is set within one among a count incrementing period and a count decrementing period for the carrier, in conjunction with a condition in which an energizing time period that is less than the threshold is set within the other among the count incrementing period and the count decrementing period, an on time period of any one among the first PWM signal, the second PWM signal, and the third PWM signal into given on time periods and to add a given divided on time period to the energizing time period that is less than the threshold.

Effects of the Invention

According to a motor controller according to the present invention, the effect of accurately detecting phase currents for at least two phases within one period of a carrier can be obtained.

BRIEF DESCRIPTION OF DRAWINGS

FIG. 2 is a diagram illustrating an example of the configuration of a carrier generator 37, a PWM signal generator 32, and the like;

FIG. 10C is a third flowchart for describing the operation relating to the pulse phase adjustment process.

DESCRIPTION OF EMBODIMENTS

A motor controller, a motor system, and a method for controlling a motor according to one or more embodiments of the present invention are described below with reference to the drawings.

First Embodiment

Figure 1:
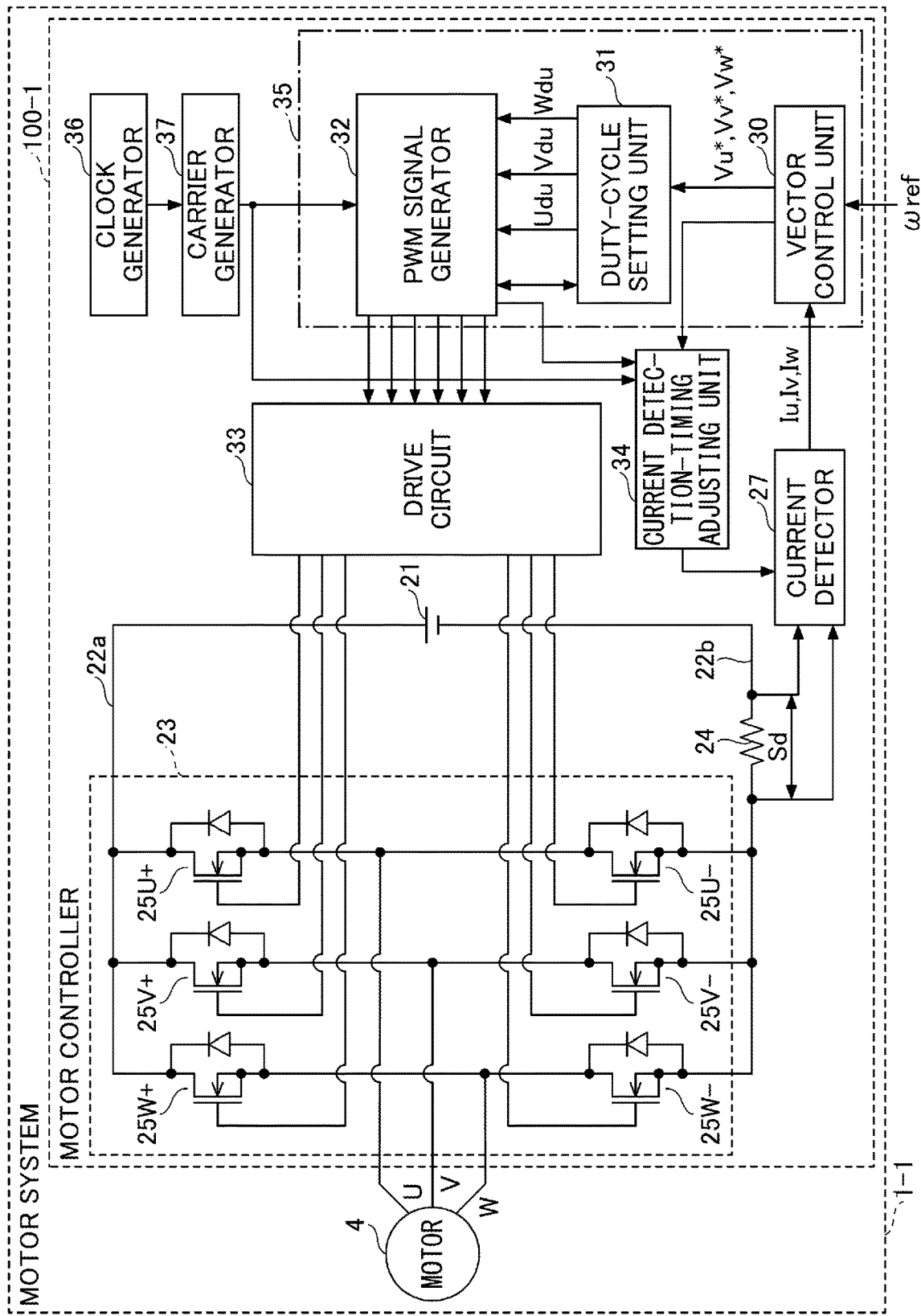
FIG. 1 is a diagram illustrating an example of the configuration of a motor system 1-1 according to a first embodiment of the present invention.
Figure 2:
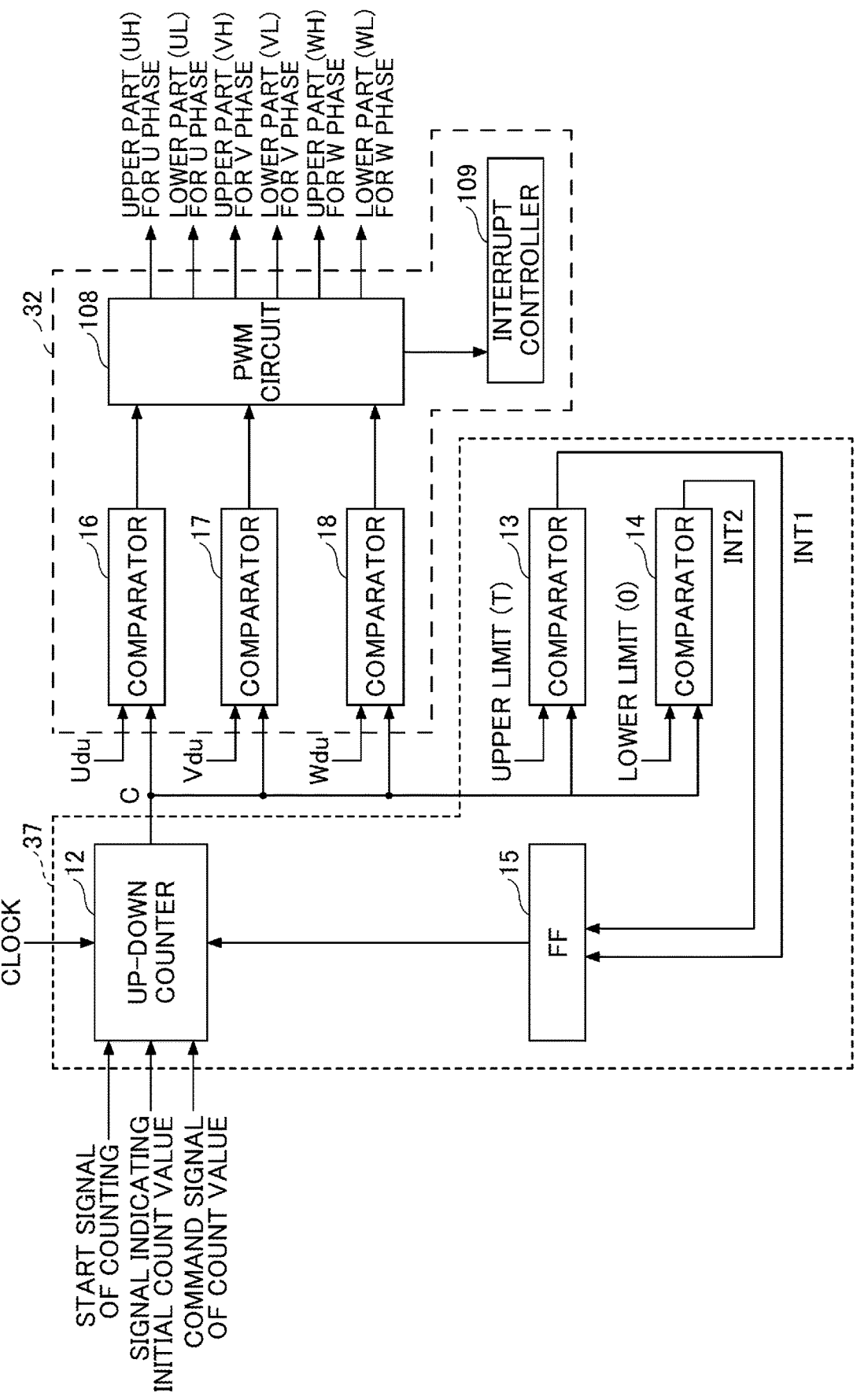

FIG. 1 is a diagram illustrating an example of the configuration of a motor system 1-1 according to a first embodiment of the present invention. FIG. 2 is a diagram illustrating an example of the configuration of a carrier, generator 37, a PWM signal generator 32, and the like illustrated in FIG. 1. The motor system 1-1 illustrated in FIG. 1 controls a rotary motion of a motor 4. A device in which the motor system 1-1 is provided includes, for example, a copier, a personal computer, a refrigerator, or the like, but is not limited thereto. The motor system 1-1 includes at least the motor 4 and a motor controller 100-1.

The motor 4 includes multiple coils. For example, the motor 4 includes three-phase coils that include a U-phase coil, a V-phase coil, and a W-phase coil. A specific example of the motor 4 includes a brushless motor, or the like.

Based on an energization pattern that includes PWM signals for three phases, the motor controller 100-1 performs on-off control for the multiple switching elements that are coupled to constitute a three-phase bridge, and thus drives the motor through an inverter that converts a direct current into a three-phase alternating current. The motor controller 100-1 includes an inverter 23, a current detector 27, and a current detection-timing adjusting unit 34. The motor controller 100-1 includes a drive circuit 33, an energization pattern generator 35, a carrier generator 37, and a clock generator 36.

The inverter 23 that is an inverting unit is a circuit that converts the direct current delivered from a DC power source 21 into the three-phase alternating current, by switching of the switching elements, and then rotates a rotor of the motor 4 in response to a three-phase drive alternating current flowing into the motor 4. The inverter 23 drives the motor 4 based on multiple energization patterns (more specifically, PWM signals for three phases generated by the PWM signal generator 32 in the energization pattern generator 35) that the energization pattern generator 35 generates.

The inverter 23 includes multiple switching elements 25U+, 25V+, 25W+, 25U−, 25V−, and 25W− that are coupled to constitute a three-phase bridge. The switching elements 25U+, 25V+, and 25W+ are high-side switching elements (upper arms) that are coupled to a positive electrode of the DC power source 21, via a positive-side bus 22a. The switching elements 25U−, 25V−, and 25W− are low-side switching elements (lower arms) that are coupled to a negative electrode (specifically, a ground) of the DC power source 21. The multiple switching elements 25U+, 25V+, 25W+, 25U−, 25V−, and 25W− are each turned on or off in accordance with a corresponding drive signal, among multiple drive signals that the drive circuit 33 provides based on respective PWM signals included in the energization pattern. In the following description, the switching elements 25U+, 25V+, 25W+, 25U−, 25V−, and 25W− may be also simply referred to as switching elements, when they are not particularly distinguished from one another.

A connection point of the switching element 25U+ and the switching element 25U− is coupled to one end of the U-phase coil of the motor 4. A connection point of the switching element 25V+ and the switching element 25V− is coupled to one end of the V-phase coil of the motor 4. A connection point of the switching element 25W+ and the switching element 25W− is coupled to one end of the W-phase coil of the motor 4. The respective other ends of the U-phase coil, the V-phase coil, and the W-phase coil are coupled to one another.

A specific example of each switching element includes an N-channel metal oxide semiconductor field effect transistor (MOSFET), an insulated gate bipolar transistor (IGBT), or the like. However, the switching element is not limited to the examples described above.

The current detection unit 24 outputs a detection signal Sd corresponding to the magnitude of the current that flows into the DC side of the inverter 23. The current detection unit 24 illustrated in FIG. 1 generates the detection signal Sd corresponding to the magnitude of the current flowing into a negative-side bus 22b. The current detection unit 24 is, for example, a current detection element disposed in the negative-side bus 22b. More specifically, the current detection unit 24 is a shunt resistor inserted in the negative-side bus 22b. The current detection element such as a shunt resistor generates, as a detection signal Sd, a voltage signal corresponding to the magnitude of the current through the current detection element. Note that as long as the current detection unit 24 outputs the detection signal corresponding to the magnitude of the current flowing into the negative-side bus 22b, it is sufficient. The current detection unit 24 may be a sensor such as a current transformer (CT).

The current detector 27 obtains the detection signal Sd based on the multiple energization patterns (more specifically, PWM signals for three phases) that the energization pattern generator 35 generates, to thereby detect phase currents Iu, Iv, and Iw for the respective phases U, V, and W flowing through the motor 4. More specifically, by obtaining the detection signal Sd at an acquisition timing that is synchronized with the multiple energization patterns (more specifically, PWM signals for three phases), the current detector 27 detects the phase currents Iu, Iv, and Iw for the U, V, and W phases to flow into the motor 4. The acquisition timing of the detection signal Sd is set by a current detection-timing adjusting unit 34.

For example, in the current detector 27; an analog-to-digital (AD) converter receives the detection signal Sd indicating an analog voltage occurring across the current detection unit 24, at the acquisition timing that is set by the current detection-timing adjusting unit 34. The AD converter is provided in the current detector 27. The current detector 27 performs AD conversion in which the received analog detection signal Sd is converted into a digital detection signal Sd. By digitally processing the digital detection signal Sd after AD conversion, the current detector 27 detects the phase currents for the U, V, and W phases to flow into the motor 4. Detected values indicating the phase currents Iu, Iv, and Iw of the phases, which are detected by the current detector 27, are provided to the energization pattern generator 35. A clock generator 36 generates a clock at a predetermined frequency, by using a built-in oscillation circuit, and outputs the generated clock to the carrier generator 37. Note that for example, the clock generator 36 operates immediately when the motor controller 100-1 is powered on.

The energization pattern generator 35 includes a duty-cycle setting unit 31 and a PWM signal generator 32. The energization pattern generator 35 generates a pattern (energization pattern of the inverter 23) in which the inverter 23 is to be energized, based on the detected values indicating the phase currents Iu, Iv, and Iw that flow into the motor 4 and that are detected by the current detector 27. The energization pattern of the inverter 23 is used interchangeably with a pattern (energization pattern of the motor 4) in which the motor 4 is to be energized. For example, the energization pattern of the inverter 23 includes PWM signals for three phases that enable the inverter 23 to be energized such that the motor 4 rotates.

Also, when the energization pattern generator 35 generates the energization pattern of the inverter 23 in vector control, the energization pattern generator 35 may include a vector control unit 30, in addition to the duty-cycle setting unit 31 and the PWM signal generator 32. Note that in the present embodiment, the energization pattern of the inverter is generated in the vector control, but is not limited thereto. A given phase voltage for each phase may be determined using of control or the like.

In response to externally receiving a rotation speed command wref for the motor 4, the vector control unit 30 generates a torque current command Iqref and an exciting current command Idre, based on a difference between either a measured value or estimated value for a rotation speed of the motor 4 and the rotation speed command wref. By vector control calculation using a rotor position θ, the vector control unit 30 calculates a torque current Iq and exciting current Id, based on the phase currents Iu, Iv, and Iw for the phases U, V, and W through the motor 4. For example, the vector control unit 30 performs a calculation in PI control, with respect to a difference between the torque current command Iqref and the torque current Iq, and then generates a voltage command Vq. For example, the vector control unit 30 performs a calculation in PI control, with respect to a difference between the exciting current command Idref and the exciting current Id, and then generates a voltage command Vd. The vector control unit 30 converters the voltage commands Vq and Vd into phase voltage commands Vu*, Vv*, and Vw* for the phases U, V, and W, by using the rotor position θ. The phase voltage commands Vu*, Vv*, and Vw* for the respective phases are provided to the duty-cycle setting unit 31.

Based on the respective received phase voltage commands Vu*, Vv*, and Vw* for the phases U, V, and W, the duty-cycle setting unit 31 sets duty cycles (setting values indicating duty cycles for respective phases) Udu, Vdu, and Wdu for generating PWM signals for three phases.

Specific examples of setting the duty cycles Udu, Vdu, and Wdu for respective phases will be described below. The duty cycles Udu, Vdu, and Wdu are set based on modulation factors modU, modV, and modW, as expressed by Equations (1) to (3) below. The duty cycles Udu, Vdu, and Wdu obtained based on Equations (1) to (3) below are each set as a sinusoidal waveform of which the phase is at an offset from other phases, by, e.g., 120 degrees. Note that an example of waveforms of the duty cycles Udu, Vdu, and Wdu for respective phases will be described below.

$$Udu = \text{mod } U \times (\text{upper limit for carrier}) \quad (1)$$

$$Vdu = \text{mod } V \times (\text{upper limit for carrier}) \quad (2)$$

$$Wdu = \text{mod } W \times (\text{upper limit for carrier}) \quad (3)$$

The PWM signal generator 32 generates an energization pattern that includes a PWM signal for a given phase among three phases, by comparing each of the duty cycles Udu, Vdu, and Wdu for respective phases, which is set by the duty-cycle setting unit 31, against a level of the carrier C. The carrier C is a carrier signal of which the level is increased or decreased periodically. The PWM signal generator 32 compares a setting value of the duty cycle for each phase, against the level of the carrier C. In a period during which the setting value of the duty cycle of a given PWM signal is greater than the level of the carrier C, the PWM signal generator 32 sets a level of the given PWM signal to a high level, based on a compared result. In contrast, in a period during which the setting value of the duty cycle of a given PWM signal is less than the level of the carrier C, the PWM signal generator 32 sets the level of the given PWM signal to a low level, based on the compared result. The PWM signal generator 32 also generates PWM signals for three phases for driving the lower arms, by inverting PWM signals for three phases for the upper arms, and then adds dead time to each of one or more PWM signals, as necessary, to thereby output energization patterns that include the generated PWM signals to the drive circuit 33.

In accordance with the given energization patterns including the respective PWM signals, the drive circuit 33 outputs drive signals for switching of six switching elements 25U+, 25V+, 25W+, 25U−, 25V−, and 25W− included in the inverter 23. In such a manner, a three-phase alternating drive current is provided to the motor 4, and thus the motor 4 rotates.

Based on the carrier C delivered from the PWM signal generator 32 and a given PWM signal generated by the PWM signal generator 32, the current detection-timing adjusting unit 34 determines an acquirement timing at which the current detector 27 detects currents for two phases (the number of phases is two), among three phases, within one period of the carrier C.

Note that functions of the current detector 27, the energization pattern generator 35, and the current detection-timing adjusting unit 34 are implemented by a program to cause a central processing unit (CPU) to be executed, where the program is readably stored in a storage device not illustrated. For example, the functions described above are implemented by hardware that communicates with software in a microcomputer that has a CPU.

Hereafter, the carrier generator 37 and the PWM signal generator 32 will be described in detail with reference to FIG. 2.

The carrier generator 37 includes an up-down counter 12, a comparator 13, a comparator 14, and a flip flop 15.

The up-down counter 12 receives a clock, which is output from the clock generator 36 illustrated in FIG. 1, a start signal of counting, and a signal indicating an initial count value.

In response to receiving the start signal of counting, the up-down counter 12 counts the number of clocks, and outputs the carrier C that is a triangular wave carrier, based on an increment (increment of one every time the clock is received), or a decrement (decrement of one every time the clock is received).

In the up-down counter 12, an initial count value is set, and the initial value is set based on the above signal indicating the initial count value.

The comparator 13 compares a count value at the up-down counter 12 against a predetermined upper limit, and detects that the count value reaches the upper limit to thereby output a detection signal INT1.

The comparator 14 compares a count value at the up-down counter 12 against a predetermined lower limit, and detects that the count value reaches the lower limit to thereby output a detection signal INT2.

The flip flop 15 outputs an "L" signal at a low level to the up-down counter 12, in accordance with the output from the comparator 13. The flip flop 15 outputs an "H" signal at a high level to the up-down counter 12, in accordance with the output from the comparator 14.

In response to receiving the "H" signal from the flip flop 15, the up-down counter 12 counts up a count value for the clock in total. In response to receiving the "L" signal from the flip flop 15, the up-down counter 12 counts down a count value for the clock in total. In such a manner, the "H" signal is an increment command to increment a total number. The "L" signal is a decrement command to decrement a total number.

The flip flop 15 receives a command signal of an initial value. Whether an initial state of the flip flop 15 is "H" or "L" is determined based on the command signal of the initial value.

The output of the comparator 13 to perform detection, i.e., a signal indicating that a given count value reaches the upper limit, is provided to the flip flop 15, as described above, while such a signal is output as the detection signal INT1.

Further, the output of the comparator 14 to perform detection, i.e., a signal indicating that a given count value reaches the lower limit, is provided to the flip flop 15, as described above, while such a signal is output as the detection signal INT2.

The PWM signal generator 32 includes three comparators 16, 17, and 18, a PWM circuit 108, and an interrupt controller 109.

The comparator 16 compares the duty cycle Udu for the U phase against the carrier C, and then outputs a compared result by using a pulse. Specifically, the comparator 16 compares a value for the duty cycle Udu against the amplitude of the carrier C. The comparator 16 outputs an "H" signal during a period in which the amplitude of the carrier C is greater than or equal to that of the duty cycle Udu. In contrast, the comparator 16 outputs a "L" signal during a period in which the amplitude of the carrier C is less than that of the duty cycle Udu.

The comparator 17 compares the duty cycle Vdu for the V phase against the carrier C, and then outputs a compared result by using a pulse. Specifically, the comparator 17 compares a value for the duty cycle Vdu against the amplitude of the carrier C. The comparator 17 outputs an "H" signal during a period in which the amplitude of the carrier C is greater than or equal to that of the duty cycle Vdu. In contrast, the comparator 17 outputs an "L" signal during a period in which the amplitude of the carrier C is less than that of the duty cycle Vdu.

The comparator 18 compares the duty cycle Udu for the W phase against the carrier C, and then outputs a compared result by using a pulse. Specifically, the comparator 18 compares a value for the duty cycle Wdu against the amplitude of the carrier C. The comparator 18 outputs an "H" signal during a period in which the amplitude of the carrier C is greater than or equal to that for the duty cycle Wdu. In contrast, the comparator 18 outputs an "L" signal during a period in which the amplitude of the carrier C is less than that of the duty cycle Wdu.

Based on the outputs from the comparators 16, 17, and 18, the PWM circuit 108 outputs six PWM signals each of which has an on-off period that is set in accordance with changes in a voltage command for a corresponding phase. The six PWM signals include a PWM signal for driving the switching element of the upper arm for the U phase, a PWM signal for driving the switching element of the lower arm for the U phase, a PWM signal for driving the switching element of the upper arm for the V phase, a PWM signal for driving the switching element of the lower arm for the V phase, a PWM signal for driving the switching element of the upper arm for the W phase, and a PWM signal for driving the switching element of the lower arm for the W phase. The six PWM signals are respectively provided to gates of the switching elements of the inverter 23. Each switching element is turned on or off by a corresponding PWM signal among the six PWM signals. In such a manner, the inverter 23 outputs respective voltages for the U phase, V phase, and W phase and then applies the voltages to the motor 4. Note that as a specific energization method, triangle wave comparison is employed in the first embodiment. However, there is no limitation to the triangle wave comparison, and another system such as a spatial vector model may be employed to output a given voltage for each phase.

The PWM circuit 108 generates an interrupt signal at a timing at which, for example, a given PWM signal rises, and causes the interrupt signal to be input to the interrupt controller 109. In response to receiving the interrupt signal from the PWM circuit 108, the interrupt controller 109 provides a command for A/D conversion to the current detector 27. Thus, the current detector 27 performs A/D conversion for the detection signal Sd at a timing at which the interrupt signal is generated.

Figure 3:
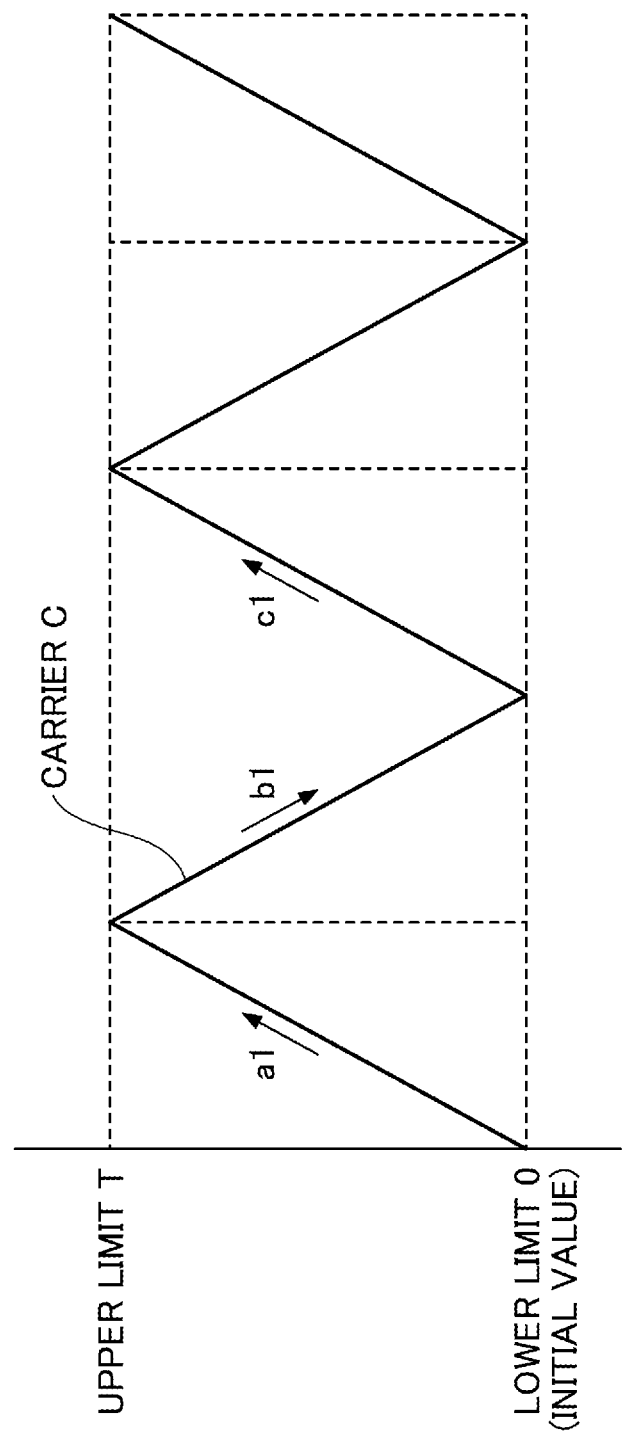
FIG. 3 is a diagram for describing the principle of generating a triangle wave carrier for each phase.

Hereafter, the principle of generating the triangular wave carrier for each phase will be described with reference to FIG. 2 and FIG. 3. FIG. 3 is a diagram illustrating the principle of generating a triangular wave carrier for each phase. The waveform of the carrier C is illustrated in FIG. 3.

In FIG. 2, when the start signal of counting is input to the up-down counter 12, the up-down counter 12 starts counting a clock from the clock generator 36. As described above, in the up-down counter 12, the initial value is set, where the initial value is, for example, set to zero. Thus, the up-down counter 12 starts counting from zero. The output of the flip flop 15 to instruct the up-down counter 12 to count up or down in total is set to "H" in an initial state. The initial state is an output state of the flip flop 15 at a timing at which the command signal of the initial value is received. In such a manner, the up-down counter 12 starts counting to increment a count value in total. As a result, as illustrated in FIG. 3, the output of the up-down counter 12 increases with time, from zero, indicating the lower limit (initial value), toward an upper limit T, as expressed by the arrow a1.

Then, when the count value reaches the upper limit T, the comparator 13 detects it and outputs the detection signal INT1 to the flip flop 15. In response to such a signal, the flip flop 15 inverts an output to output an "L" signal. Thus, the operation of the up-down counter 12 shifts from an increment operation to a decrement operation. As a result, as illustrated in FIG. 3, the output of the up-down counter decreases with time, from the upper limit T to zero of the lower limit, as expressed by the arrow b1.

Then, when the count value reaches the lower limit of zero, the comparator 14 detects it and provides the detection signal INT2 to the flip flop 15. In response to such a signal, the flip flop 15 inverts an output to output an "H" signal. Thus, the operation of the up-down counter 12 again shifts to the increment operation, and the output of the up-down counter is increased, from zero of the lower limit toward the upper limit T, as expressed by the arrow c1.

By repeating the increment and decrement operations described above, the up-down counter 12 outputs the triangular wave carrier C, as illustrated in FIG. 3.

Note that in the first embodiment, the carrier C is generated at a valley (lower limit), but may be generated at a peak (upper limit). In this case, an initial value of the carrier C indicates T (upper limit), and an initial command value indicates "L", where a given phase is at an offset by one half of a period, compared to the carrier generated at the valley.

Note that in the first embodiment, the carrier C is output using a triangle wave, but may be output using a sawtooth wave or the like, which is achieved by an output compare function.

Figure 4:
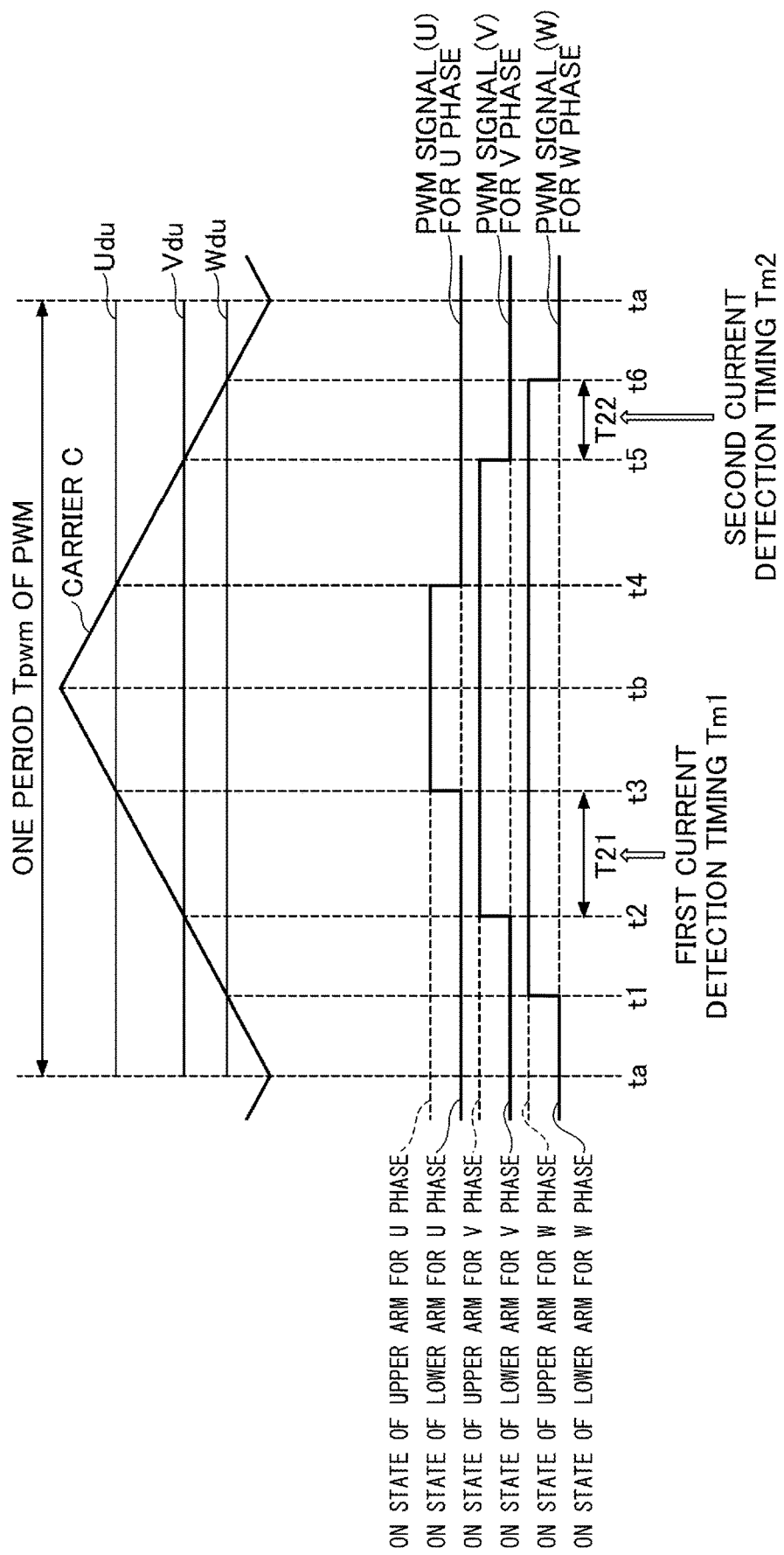
FIG. 4 is a diagram illustrating waveforms of a plurality of PWM signals U, V, and W, a waveform of a carrier C set within one period of each PWM signal, and waveforms of duty cycles Udu, Vdu, and Wdu for respective phases.

FIG. 4 is a diagram illustrating the waveforms of the multiple PWM signals U, V, and W, the waveform of the carrier C set during one period of each PWM signal, and waveforms of the duty cycle Udu, Vdu, and Wdu for respective phases.

As illustrated in FIG. 4, each of the multiple PWM signals U to W is generated such that a high level and low level are inverted at a timing at which a corresponding duty cycle among the duty cycles Udu, Vdu, and Wdu for respective phases meets the carrier C.

The PWM signal U is a PWM signal for driving two switching elements that constitute the upper and lower arms for the U phase. In FIG. 4, the PWM signal U is expressed as a "PWM signal (U) for U phase". When the PWM signal U is at a low level, the switching element of the lower arm for the U phase is on (the switching element of the upper arm for the U phase is off), and when the PWM signal U is at a high level, the switching element of the lower arm for the U phase is off (the switching element of the upper arm for the U phase is on). In response to changes in the level of the PWM signal U, two switching elements constituting the upper and lower arms for the U phase are turned on or off complementarily.

The PWM signal V is a PWM signal for driving two switching elements that constitute the upper and lower arms for the V phase. In FIG. 4, the PWM signal V is expressed as a "PWM signal (V) for V phase". When the PWM signal V is at a low level, the switching element of the lower arm for the V phase is on (the switching element of the upper arm for the V phase is off), and when the PWM signal V is at a high level, the switching element of the lower arm for the V phase is off (the switching element of the upper arm for the V phase is on). In response to changes in the level of the PWM signal V, two switching elements constituting the upper and lower arms for the V phase are turned on or off complementarily.

The PWM signal W is a PWM signal for driving two switching elements that constitute the upper and lower arms for the W phase. In FIG. 4, the PWM signal W is expressed as a "PWM signal (W) for W phase". When the PWM signal W is at a low level, the switching element of the lower arm for the W phase is on (the switching element of the upper arm for the W phase is off), and when the PWM signal W is at a high level, the switching element of the lower arm for the W phase is off (the switching element of the upper arm for the W phase is on). In response to changes in the level of the PWM signal W, two switching elements constituting the upper and lower arms for the W phase are turned on or off complementarily.

Note that the timing at which a given PWM signal among the PWM signals U to W changes from the low level to the high level is slightly later than the timing at which a corresponding duty cycle among the duty cycles Udu, Vdu, and Wdu for respective phases meets the carrier C. This is because dead time is required to prevent short-circuiting of a given upper arm and lower arm. In FIG. 4, illustration of the dead time is omitted for the purpose of illustration. In the following description, the PWM signals U to W may be referred to as "PWM signals", when they are not distinguished.

As illustrated in FIG. 4, in one period Tpwm of each of the PWM signals U to W, change points (t1 to t6) of a corresponding PWM signal among the multiple PWM signals U to W are defined as follows.

A change point t1 is a timing (timing at which the upper arm for the W phase is changed from off to on) at which the lower arm for the W phase is changed from on to off. A change point t2 is a timing (timing at which the upper arm for the V phase is changed from off to on) at which the lower arm for the V phase is changed from on to off. A change point t3 is a timing (timing at which the upper arm for the U phase is changed from off to on) at which the lower arm for the U phase is changed from on to off. A change point t4 is a timing (timing at which the upper arm for the U phase is changed from on to off) at which the lower arm for the U phase is changed from off to on. A change point t5 is a timing (timing at which the upper arm for the V phase is changed from on to off) at which the lower arm for the V phase is changed from off to on. A change point t6 is a timing (timing at which the upper arm for the W phase is changed from on to off) at which the lower arm for the W phase is changed from off to on.

In the present embodiment, a first current detection timing Tm1 is defined within a period from t2 to t3, and a second current detection timing Tm2 is defined within a period from t5 to t6. However, the periods within which the first current detection timing Tm1 and the second current detection timing Tm2 are set are not limited to the periods described above.

In a state where the inverter 23 outputs a three-phase alternating current modulated in PWM, the current detector 27 can detect the current for a particular phase, based on a corresponding pattern among the energization patterns for the switching elements 25U+, 25V+, and 25W+ that are on the upper arms side. Alternatively, in a state where the inverter 23 outputs a three-phase alternating current modulated in PWM, the current detector 27 may detect the current for a particular phase, based on a corresponding pattern among the energization patterns for the switching elements 25U−, 25V−, and 25W− that are on the lower arms side.

For example, as illustrated in FIG. 4, within an energizing time period T21, the magnitude of the voltage occurring across both ends of the current detection unit 24 corresponds to the magnitude of the current that is a positive phase current Iu+. The energizing time period T21 is a period from t2 to t3. The energizing time period T21 corresponds to a period during which the switching element of the lower arm for the U phase is in an on state, the switching element of the lower arm for the V phase is in an off state, and the switching element of the lower arm for the W phase is in an off state. Thus, by acquiring the detection signal Sd at the first current detection timing Tm1 set within the energizing time period T21, the current detector 27 can detect the magnitude of the current that is the positive phase current Iu+.

After a predetermined delay time td elapses from the time when the level of a given PWM signal for one phase, among the PWM signals, shifts to a different logic level from PWM signals for remaining two phases (for example, t4: a timing at which the level of a given PWM signal for the U phase changes from the same high level as levels of PWM signals for the V phase and W phase, to a different low level from levels of the PWM signals for the V phase and W phase), the current detection-timing adjusting unit 34 sets the first current detection timing Tm1. At this time, the current detection-timing adjusting unit 34 sets the first current detecting timing Tm1 within the energizing time period T21.

The delay time td is expressed by Equation (4) below. Where, Tdead represents dead time, and Tring represents the time required for ringing resulting from changes in a given PWM signal to fail to occur.

$$Td = T\text{dead} + T\text{ring} \quad (4)$$

Also, for example, as illustrated in FIG. 4, in an energizing time period T22, the magnitude of the voltage occurring across the both ends of the current detection unit 24 corresponds to the magnitude of the current that is a negative phase current Iw−. The energizing time period T22 is a period from t5 to t6. The energizing time period T22 corresponds to a period in which the switching element for the lower arm for the U phase is in an on state, the switching element of the lower arm for the V phase is in an on state, and the switching element of the lower arm for the W phase is in an off state. Thus, by acquiring the detection signal Sd at the second current detecting timing Tm2 set within the energizing time T21, the current detector 27 can detect a negative phase current Iw−.

After a predetermined delay time td elapses from the time when the level of a given PWM signal for one phase, among the PWM signals, shifts to a different logic level from PWM signals for remaining two phases (for example, t5: a timing at which the level of a given PWM signal for the V phase changes from the same high level as a level for the W phase, to the same low level as that for the U phase, so that the level for the W phase becomes a different logical level from levels for the U phase and V phase), the current detection-timing adjusting unit 34 sets the second current detection timing Tm2. At this time, the current detection-timing adjusting unit 34 sets the second current detecting timing Tm2 within the energizing time period T22.

Likewise, the current detector 27 can also detect the magnitude of a given current for another phase.

As described above, when currents for two phases, among the phase currents Iu, Iv, and Iw, are sequentially detected based on energization patterns that include PWM signals for three phase, and then the detected currents are stored, three-phase currents can be detected by time division. In view of a total sum of the three-phase currents being zero, for modulation for three phases, if phase currents for two phases of three phases can be detected, the current detector 27 can also detect a phase current for the remaining one phase.

Here, when the amplitude relationship among the duty cycles Udu, Vdu, and Wdu changes, the on time for a duty cycle for each of one or more among a first PWM signal, a second PWM signal, and a third PWM signal also changes accordingly. Specific examples of changes in the amplitude relationship among the duty cycles Udu, Vdu, and Wdu will be described below. The first PWM signal is, for example, a PWM signal for driving the switching element of the lower arm for the U phase. The second PWM signal is, for example, a PWM signal for driving the switching element of the lower arm for the V phase. The third PWM signal is, for example, a PWM signal for driving the switching element of the lower arm for the W phase.

Due to changes in an amplitude relationship among the duty cycles Udu, Vdu, and Wdu, even when an energizing time period that is greater than or equal to a threshold is set within one among a count incrementing period and a count decrementing period for the carrier, and an energizing time period that is less than the threshold is set within the other among the count incrementing period and the count decrementing period, the motor controller 100-1 according to the first embodiment is configured to divide an on time period of any one among a first PWM signal, a second PWM signal, and a third PWM signal into given on time periods and to add a given divided on time period to the energizing time period that is less than the threshold.

Figure 5:
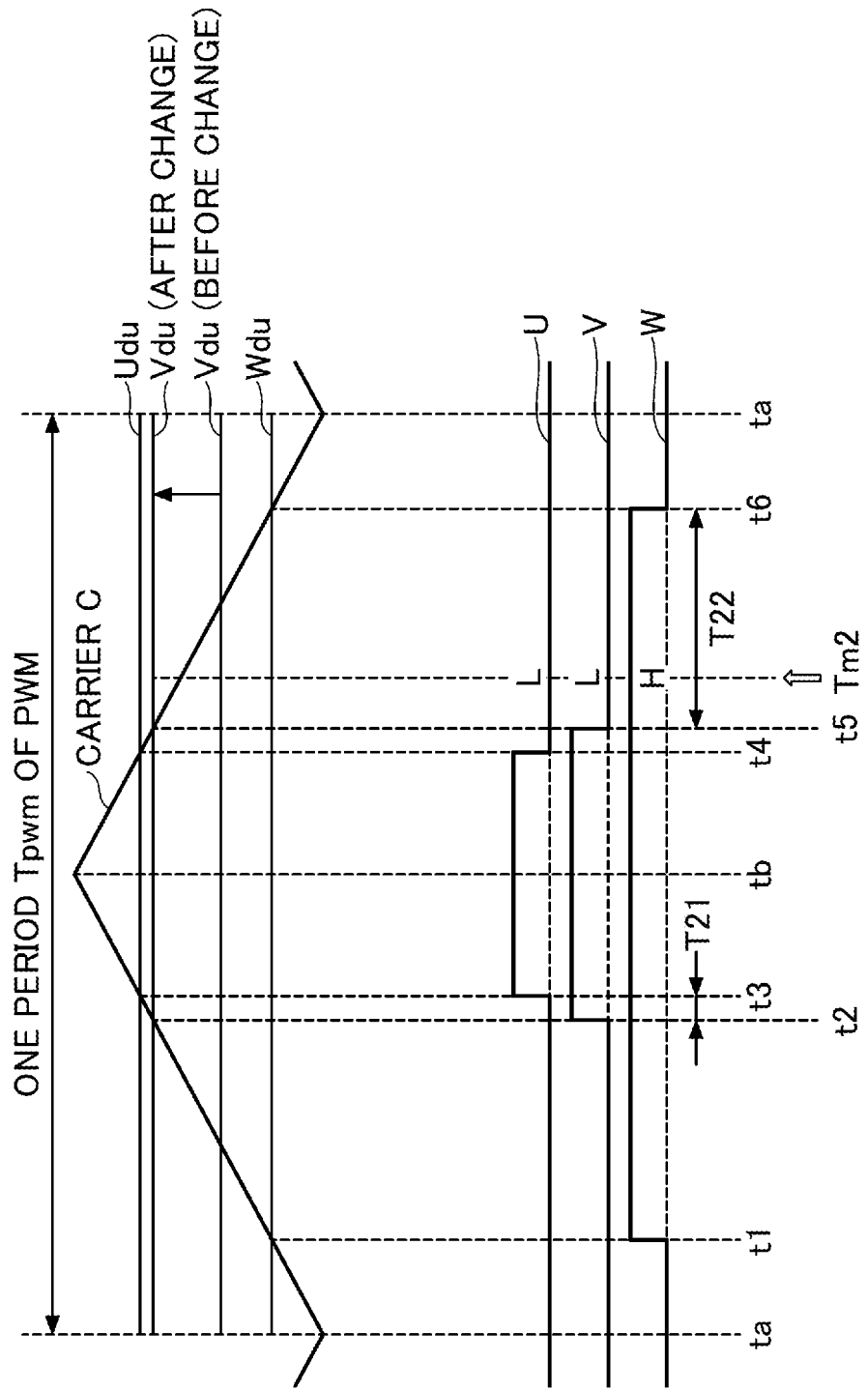
FIG. 5 is a first diagram for describing a pulse phase adjustment operation according to the first embodiment of the present invention.
Figure 6:
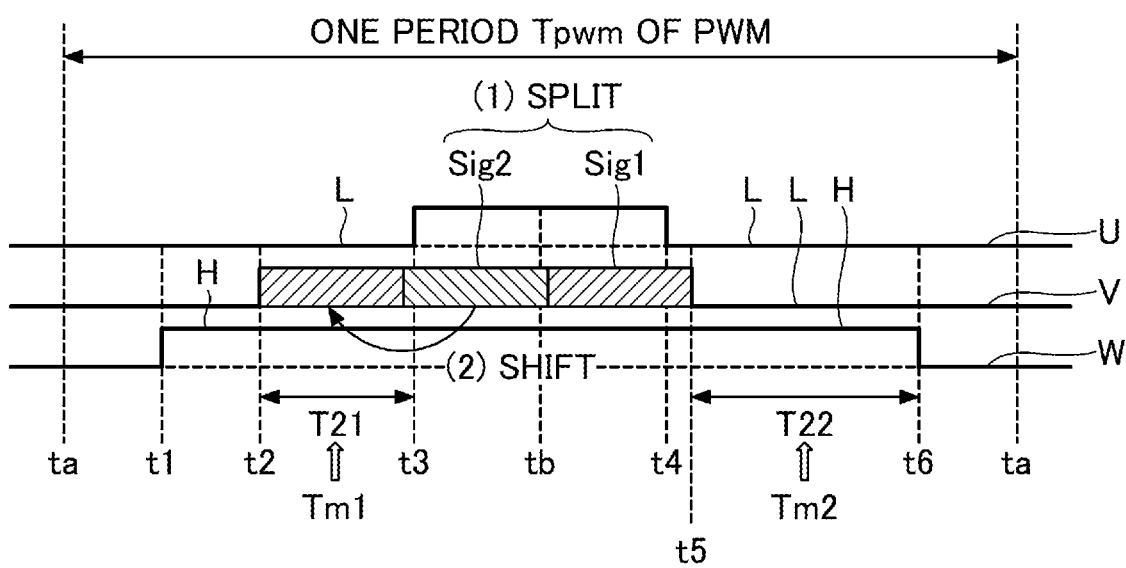
FIG. 6 is a second diagram for describing the pulse phase adjustment operation according to the first embodiment of the present invention.

FIG. 5 is a first diagram for describing a pulse phase adjustment operation according to the first embodiment of the present invention. FIG. 6 is a second diagram for describing the pulse phase adjustment operation according to the first embodiment of the present invention.

As illustrated in FIG. 5, even when an on time period of the PWM signal for the U phase changes in accordance with changes in the duty cycle Vdu, the current detection-timing adjusting unit 34 is configured to enable setting of a given second current detection timing Tm2 within the energizing time period T22, which is within the count decrementing period, in order to ensure the energizing time period T22. However, if the energizing time period T22 becomes smaller, e.g., less than a period of the delay time td, the energizing time period T21 could no longer be ensured within a count incrementing period.

Due to changes in the duty cycle Vdu, or the like, even if the energizing time period T21 and the energizing time period T22 could not be each ensured within a given period among the count incrementing period and the count decrementing period, the motor controller 100-1 according to the present embodiment is configured to enable a given energizing time period to be ensured by dividing (pulse phase adjustment) of a given PWM signal.

In FIG. 6, a manner of dividing a pulse is illustrated. In an example in FIG. 6, in (1), for a high level period of the PWM signal for the V phase, the pulse is divided into a first signal sigS1 and a second signal sigS2, and subsequently, in (2), the second signal 2 is advanced to a phase lead side, so that the energizing time period T21 is ensured.

Figure 7:
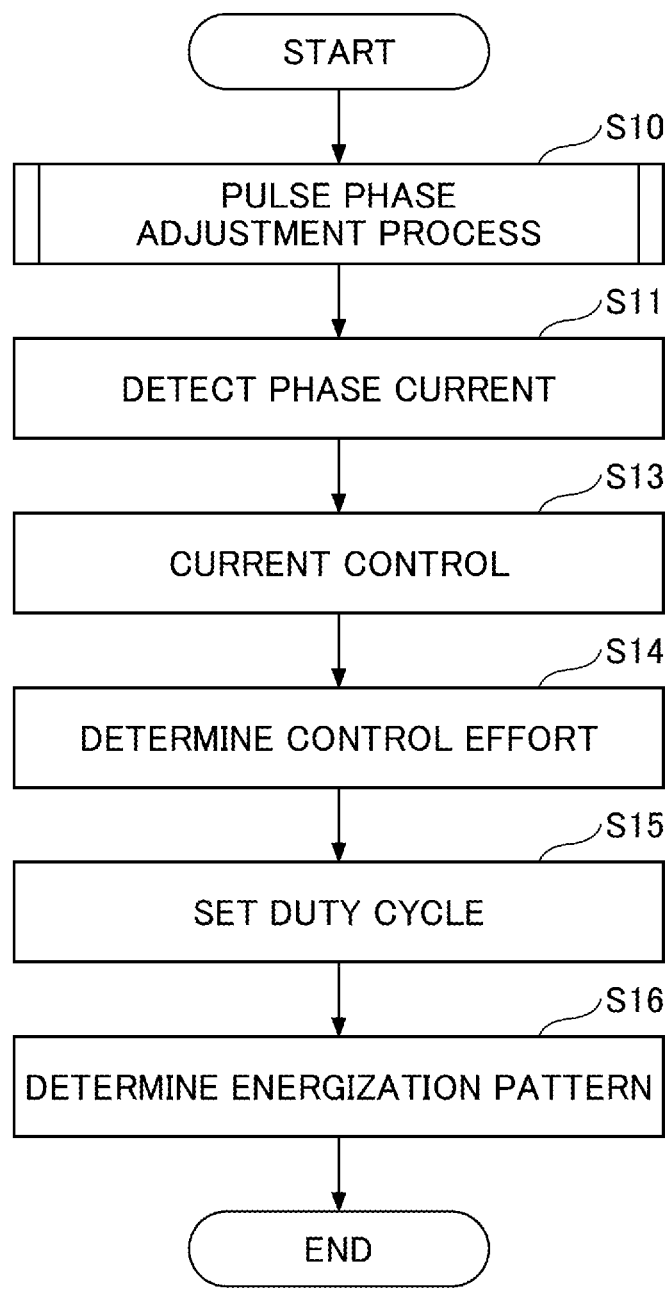
FIG. 7 is a flowchart illustrating the operation of a motor controller 100-1.

Hereafter, the operation of the motor controller 100-1 will be described. FIG. 7 is a flowchart illustrating the operation of the motor controller 100-1. In the present embodiment, a PWM counter interrupt process illustrated in FIG. 7 is performed at each timing of a phase to with respect to the bottom of the carrier C.

In step S10, the PWM signal generator 32 performs a pulse phase adjustment process. The pulse phase adjustment process will be described below in detail.

In step S11, the current detector 27 detects the phase currents Iu, Iv, and Iw for the U, V, and W phases. An interrupt process (for example, an interrupt process in which AD conversion is performed for the detection signal Sd) of current detection in which the current detector 27 acquires the detection signal Sd is performed twice within one period Tpwm of the carrier C (see FIGS. 8 and 9), in addition to the process illustrated in FIG. 7.

Figure 8:
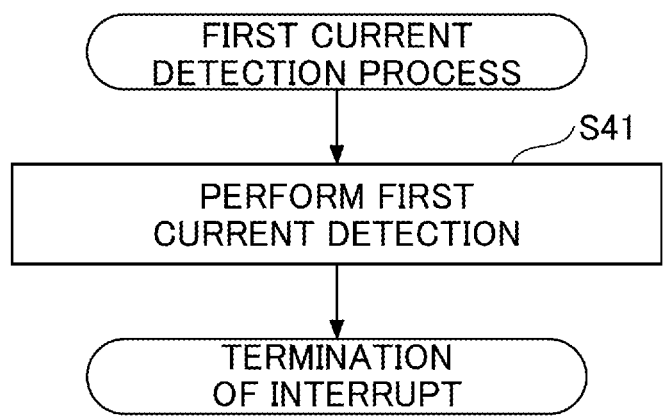
FIG. 8 is a flowchart illustrating an example of a first current detection process.

FIG. 8 is a flowchart illustrating an example of a first current detection process. When a count value at the up-down counter 12 matches a value corresponding to a value set when the delay time td elapses from t2, the current detection-timing adjusting unit 34 asserts a setting register for the first current detection timing Tm1. When the setting register for the first current detection timing Tm1 is asserted, the current detector 27 acquires the detection signal Sd by using an AD converter (step S41), and then stores an acquired value of the detection signal Sd in a first acquisition register.

Figure 9:
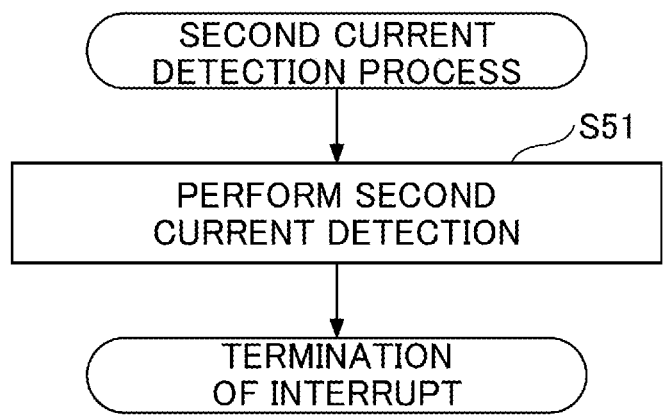
FIG. 9 is a flowchart illustrating an example of a second current detection process.

FIG. 9 is a flowchart illustrating an example of a second current detection process. When a count value of the up-down counter 12 matches a value corresponding to a value set when the delay time td elapses from t5, the current detection-timing adjusting unit 34 asserts a setting register for the second current detection timing Tm2. When the setting register for the second current detection timing Tm2 is asserted, the current detector 27 acquires the detection signal Sd by using an AD converter (step S51), and then stores an acquired value of the detection signal Sd in a second acquisition register.

The current detector 27 detects the three-phase currents Iu, Iv, and Iw, based on setting values of the detection signals Sd that are respectively stored in the first acquisition register and the second acquisition register.

The vector control unit 30 performs current control, such as PI control, based on calculated magnitudes of the three-phase currents Iu, Iv, and Iw that are detected by the current detector 27 (step S13).

Then, the vector control unit 30 calculates phase voltage commands Vu*, Vv*, and Vw* (control efforts) for respective phases (step S14).

In step S15, the duty-cycle setting unit 31 sets duty cycles for the phases, based on the respective phase voltage commands Vu*, Vv*, and Vw* for the phases calculated in step S14. Then, in step S16, the PWM signal generator 32 determines which energization pattern among the energization patterns is used to control the energizing of the inverter 23, based on the duty cycles for the phases set by the duty-cycle setting unit 31.

Figure 10A:
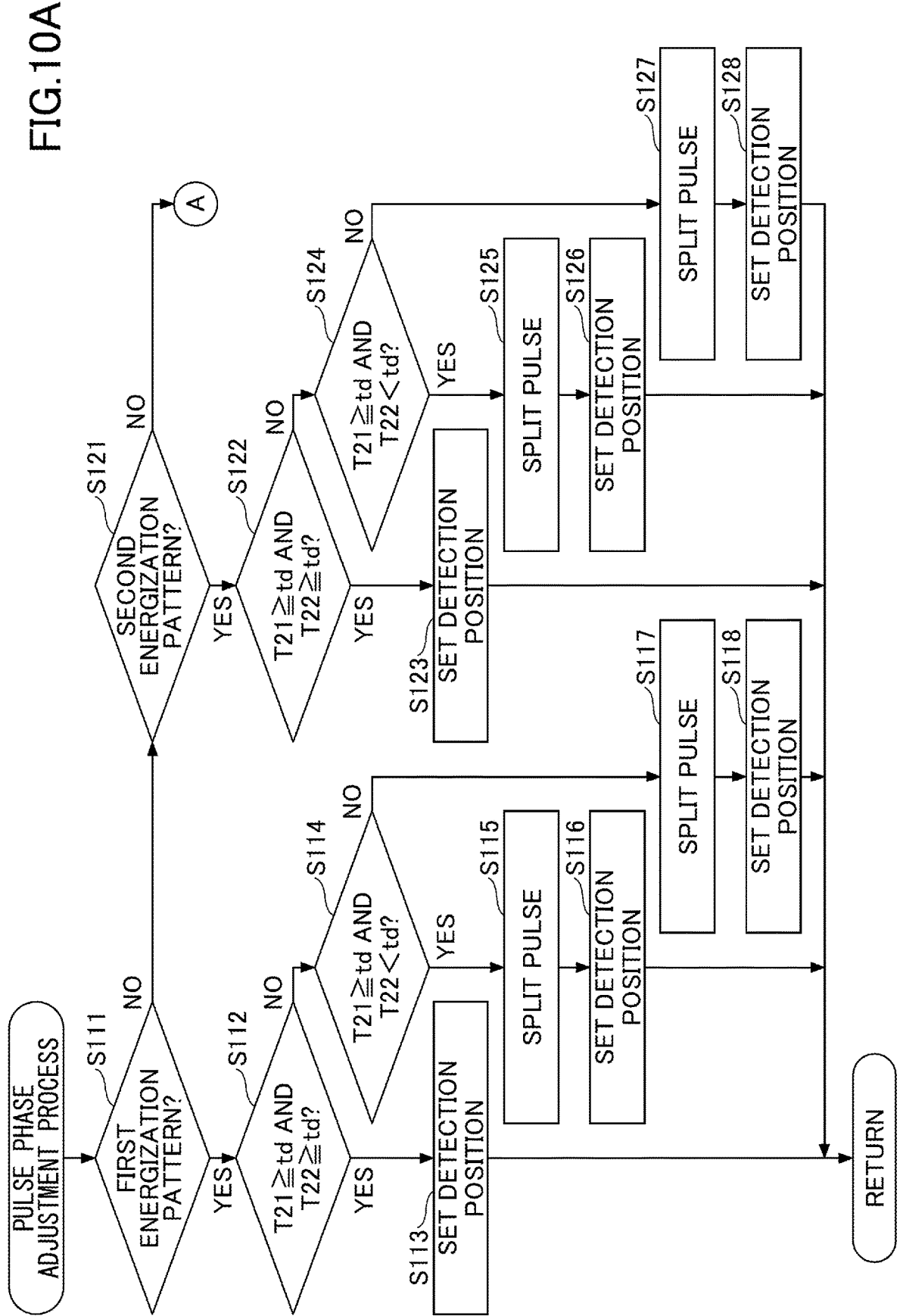
FIG. 10A is a first flowchart for describing the operation relating to a pulse phase adjustment process.
Figure 10B:
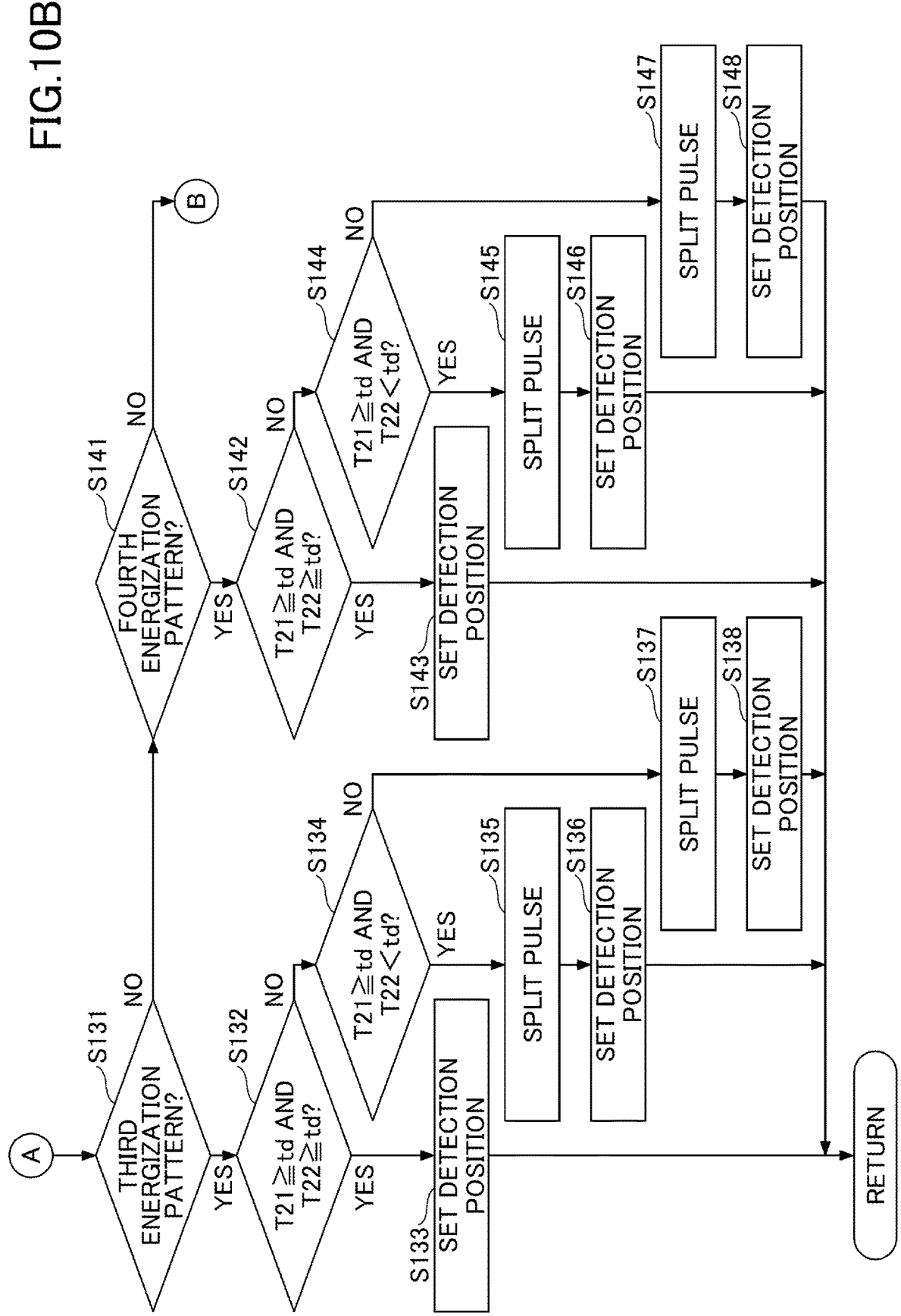
FIG. 10B is a second flowchart for describing the operation relating to the pulse phase adjustment process.

Hereafter, the operation relating to the pulse-phase adjustment process will be described. FIG. 10 is a flowchart for description of the operation relating to the pulse-phase adjustment process.

In the PWM signal generator 32, first to sixth current energization patterns are set as follows. The first to sixth current energization patterns are defined based on a time length relationship among on time periods of PWM signals for the phases, which each cover both a phase lag side and a phase lead side, relative to the reference phase tb (see FIG. 4). For example, in a first energization condition, a small on time period, a medium on time period, and a great on time period are respectively set for the U phase, the V phase, and the W phase (on time period for the W phase>on time period for the V phase>on time period for the U phase). In a second energization condition, small, great, and medium on time periods are set respectively for the U phase, the V phase, and the W phase. In a third energization condition, medium, small, and great on time periods are set respectively for the U phase, the V phase, and the W phase. In a fourth energization condition, medium, great, and small on time periods are set respectively for the U phase, the V phase, and the W phase. In a fifth energization condition, great, medium, and small on time periods are set respectively for the U phase, the V phase, and the W phase. In a sixth energization condition, great, small, and medium on time periods are set respectively for the U phase, the V phase, and the W phase.

If the first energization pattern is satisfied (Yes in step S111), the PWM signal generator 32 determines whether the condition "T21≥td and T22≥td" is satisfied (step S112).

If the condition "T21≥td and T22≥td" is satisfied (Yes in step S112), the PWM signal generator 32 sets Tm1 within T21 and sets Tm2 within T22 (step S113).

If the condition "T21≥td and T22≥td" is not satisfied (No in step S112), the PWM signal generator 32 performs the process in step S114.

If the condition "T21≥td and T22<td" is satisfied (Yes in step S114), the PWM signal generator 32 splits a given pulse in step S115, and sets Tm1 within T21 and sets Tm2 within T22 (step S116).

If the condition "T21≥td and T22<td" is not satisfied (No in step S114), the PWM signal generator 32 determines that the condition "T21<td and T22≥td" is satisfied, splits a given pulse in step S117, and sets Tm1 within T21 and sets Tm2 within T22 (step S118).

If the first energization pattern is not satisfied (No in step S111), the PWM signal generator 32 performs the process in step S121.

If the second energization pattern is satisfied (Yes in step S121), the PWM signal generator 32 determines whether the condition "T21≥td and T22≥td" is satisfied (step S122).

If the condition "T21≥td and T22≥td" is satisfied (Yes in step S122), the PWM signal generator 32 sets Tm1 within T21 and sets Tm2 within T22 (step S123).

If the condition "T21≥td and T22≥td" is not satisfied (No in step S122), the PWM signal generator 32 performs the process in step S124.

If the condition "T21≥td and T22<td" is satisfied (Yes in step S124), the PWM signal generator 32 splits a given pulse in step S125, and sets Tm1 within T21 and sets Tm2 within T22 (step S126).

If the condition "T21≥td and T22<td" is not satisfied (No in step S124), the PWM signal generator 32 determines that the condition "T21<td and T22≥td" is satisfied, splits a given pulse in step S127, and sets Tm1 within T21 and sets Tm2 within T22 (step S128).

If the second energization pattern is not satisfied (No in step S121), the PWM signal generator 32 performs the process in step S131.

If the third energization pattern is satisfied (Yes in step S131), the PWM signal generator 32 determines whether the condition "T21≥td and T22≥td" is satisfied (step S132).

If the condition "T21≥td and T22≥td" is satisfied (Yes in step S132), the PWM signal generator 32 sets Tm1 within T21 and sets Tm2 within T22 (step S133).

If the condition "T21≥td and T22≥td" is not satisfied (No in step S132), the PWM signal generator 32 performs the process in step S134.

If the condition "T21≥td and T22<td" is satisfied (Yes in step S134), the PWM signal generator 32 splits a given pulse in step S135, and sets Tm1 within T21 and sets Tm2 within T22 (step S136).

If the condition "T21≥td and T22<td" is not satisfied (No in step S134), the PWM signal generator 32 determines that the condition "T21<td and T22≥td" is satisfied, splits a given pulse in step S137, then sets Tm1 within T21 and sets Tm2 within T22 (step S138).

If the third energization pattern is not satisfied (No in step S1311), the PWM signal generator 32 performs the process in step S141.

If the fourth energization pattern is satisfied (Yes in step S141), the PWM signal generator 32 determines whether the condition "T21≥td and T22≥td" is satisfied (step S142).

If the condition "T21≥td and T22≥td" is satisfied (Yes in step S142), the PWM signal generator 32 sets Tm1 within T21 and sets Tm2 within T22 (step S143).

If the condition "T21≥td and T22≥td" is not satisfied (No in step S142), the PWM signal generator 32 performs the process in step S144.

If the condition "T21≥td and T22≥td" is satisfied (Yes in step S144), the PWM signal generator 32 splits a given pulse in step S145, and sets Tm1 within T21 and sets Tm2 within T22 (step S146).

If the condition "T21≥td and T22<td" is not satisfied (No in step S144), the PWM signal generator 32 determines that the condition "T21<td and T22≥td" is satisfied, splits a given pulse in step S147, and sets Tm1 within T21 and sets Tm2 within T22 (step S148).

If the fourth energization pattern is not satisfied (No in step S1411), the PWM signal generator 32 perform the process in step S151.

If the fifth energization pattern is satisfied (Yes in step S151), the PWM signal generator 32 determines whether the condition "T21≥td and T22≥td" is satisfied (step S152).

If the condition "T21≥td and T22≥td" is satisfied (Yes in step S152), the PWM signal generator 32 sets Tm1 within T21 and sets Tm2 within T22 (step S153).

If the condition "T21≥td and T22≥td" is not satisfied (No in step S152), the PWM signal generator 32 performs the process in step S154.

If the condition "T21≥td and T22<td" is satisfied (Yes in step S154), the PWM signal generator 32 splits a given pulse in step S155, sets Tm1 within T21 and sets Tm2 within T22 (step S156).

If the condition "T21≥td and T22<td" is not satisfied (No in step S154), the PWM signal generator 32 determines that the condition "T21<td and T22≥td" is satisfied, splits a given pulse in step S157, and sets Tm1 within T21 and sets Tm2 within T22 (step S158).

If the fifth energization pattern is not satisfied (No in step S151), the PWM signal generator 32 determines that the sixth energization pattern is satisfied, and performs the process in step S162.

In step S162, the PWM signal generator 32 determines whether the condition "T21≥td and T22≥td" is satisfied.

If the condition "T21≥td and T22≥td" is satisfied (Yes in step S162), the PWM signal generator 32 sets Tm1 within T21 and sets Tm2 within T22 (step S163).

If the condition "T21≥td and T22≥td" is not satisfied (No in step S162), the PWM signal generator 32 performs the process in step S164.

If the condition "T21≥td and T22<td" is satisfied (Yes in step S164), the PWM signal generator 32 splits a given pulse in step S165, and sets Tm1 within T21 and sets Tm2 within T22 (step S166).

If the condition "T21≥td and T22<td" is not satisfied (No in step S164), the PWM signal generator 32 determines that the condition "T21<td and T22≥td" is satisfied, splits a given pulse in step S167, and sets Tm1 within T21 and sets Tm2 within T22 (step S168).

Note that the PWM signal generator 32 according to the present embodiment generates PWM signals for respective phases, by using the carrier C in common with the phases. In other words, in the present embodiment, carriers C used for the respective phases are not generated. Further, in the present embodiment, a given triangle wave that is bilaterally symmetrical with respect to a phase tb is used as the carrier C, and thus a circuit configuration that generates the waveform of a given PWM signal for each phase can be simplified. The up-down counter 12 decrements a count up to the phase ta, increments a count from the phase ta to the phase tb, and decrements a count after the phase tb. In such a manner, a count incrementing period and a count decrementing period are repeated.

Note that the present embodiment is described in which the first PWM signal is a PWM signal for the U phase, the second PWM signal is a PWM signal for the V phase, and the third PWM signal is a PWM signal for the W phase. However, types of the first PWM signal, second PWM signal, and third PWM signal are not limited to the example described above.

As described above, a motor controller 100-1 according to the first embodiment includes an inverter configured to drive a motor based on a first PWM signal, a second PWM signal, and a third PWM signal. The motor controller includes a current detection unit configured to output a detection signal corresponding to a magnitude of a current flowing into a direct current line of the inverter. The motor controller includes a current detector configured to detect a phase current for each phase, by obtaining the detection signal. The motor controller includes a duty-cycle setting unit configured to set a duty cycle of each of the first PWM signal, the second PWM signal, and the third PWM signal, based on a corresponding detected value for a given phase. The motor controller includes a PWM signal generator configured to generate each of the first PWM signal, the second PWM signal, and the third PWM signal, by comparing a setting value of a corresponding duty cycle against a level of a carrier, the level of the carrier increasing or decreasing periodically. The PWM signal generator is configured to divide, upon occurrence of a condition in which an energizing time period that is greater than or equal to a threshold is set within one among a count incrementing period and a count decrementing period for the carrier, in conjunction with a condition in which an energizing time period that is less than the threshold is set within the other among the count incrementing period and the count decrementing period, an on time period of any one among the first PWM signal, the second PWM signal, and the third PWM signal into given on time periods and to add a given divided on time period to the energizing time period that is less than the threshold.

In such a configuration, by dividing an on time period of any one among the first PWM signal, the second PWM signal, and the third PWM signal into given on time periods to thereby add a given divided on time period to the energizing time period that is less than the threshold, energizing time periods T11 and T21 can be ensured. Thus, one or more given phase currents can be accurately detected.

The energizing time period T11, which is for detecting a phase current for one of two phases, and the energizing time period T21, which is for detecting a phase current for the other phase, are respectively assigned to a first half and a second half of one period of the carrier C. In such a manner, in comparison to a case where two acquisition timings are set within a half period of the carrier C, a great time interval (time interval for performing an interrupt process) between an acquisition timing A and an acquisition timing B can be obtained. With such a greater time interval, even if a CPU having a small processing capacity is used, delays in setting a given acquisition timing can be reduced.

As described above, although the motor controller, the motor system, and the method for controlling a motor have been described according to the embodiments, the present invention is not limited to the above-described embodiments. Various changes or modifications, such as combinations or substitutions of some or all of embodiments, can be made within the scope of the present invention.

This International Application claims priority to Japanese Patent Application No. 2019-057289, filed Mar. 25, 2019, the contents of which are incorporated herein by reference in their entirety.

REFERENCE SIGNS LIST 1-1 motor system, 4 motor, 12 up-down counter, 13 comparator, 14 comparator, 15 flip flop, 16 comparator, 17 comparator, 18 comparator, 21 DC power supply, 22a positive-side bus, 22b negative-side bus, 23 inverter, 24 current detection unit, 25U switching element, 25V switching element, 25W switching element, 27W current detector, 27 current detector, 30 vector control unit, 31 duty-cycle setting unit, 32 PWM signal generator, 33 drive circuit, 34 current detection-timing adjusting unit, 35 energization pattern generator, 36 clock generator, 37 carrier generator, 100-1 motor controller, 108 PWM circuit, 109 interrupt controller

The invention claimed is:

1. A motor controller comprising:
an inverter configured to drive a motor based on a first PWM signal, a second PWM signal, and a third PWM signal;
a current detection unit configured to output a detection signal corresponding to a magnitude of a current flowing into a direct current line of the inverter;
a current detector configured to detect a phase current for each phase, by obtaining the detection signal;
a duty-cycle setting unit configured to set a duty cycle of each of the first PWM signal, the second PWM signal, and the third PWM signal, based on a corresponding detected value for a given phase; and
a PWM signal generator configured to generate each of the first PWM signal, the second PWM signal, and the third PWM signal, by comparing a setting value of a corresponding duty cycle against a level of a carrier, the level of the carrier increasing or decreasing periodically, wherein the PWM signal generator is configured to:
divide, upon occurrence of a condition in which a first energizing time period that is greater than or equal to a threshold is set within one among a count incrementing period and a count decrementing period for the carrier, in conjunction with a condition in which a second energizing time period that is less than the threshold is set within the other among the count incrementing period and the count decrementing period, an on time period of any one PWM signal among the first PWM signal, the second PWM signal, and the third PWM signal into given on time periods and to add a given divided on time period to the second energizing time period that is less than the threshold such that,
the on time period of the one PWM signal among the first PWM signal, the second PWM signal, and the third PWM signal is adjusted to lengthen the second energizing period in accordance with the given divided on time period, and on time periods of the two remaining PWM signals among the first PWM signal, the second PWM signal, and the third PWM signal are not adjusted.

2. A motor system comprising:
the motor controller according to claim 1; and
the motor.

3. A method for controlling a motor for execution by a motor controller to control the motor, the method comprising:
outputting a detection signal corresponding to a magnitude of a current flowing into a direct current line of an inverter that drives the motor based on a first PWM signal, a second PWM signal, and a third PWM signal;
detecting a phase current for each phase, by obtaining the detection signal;
setting a duty cycle of each of the first PWM signal, the second PWM signal, and the third PWM signal, based on a corresponding detected value for a given phase;
generating each of the first PWM signal, the second PWM signal, and the third PWM signal, by comparing a setting value of a corresponding duty cycle against a level of a carrier, the level of the carrier increasing or decreasing periodically; and
dividing, upon occurrence of a condition in which a first energizing time period that is greater than or equal to a threshold is set within one among a count incrementing period and a count decrementing period for the carrier, in conjunction with a condition in which a second energizing time period that is less than the threshold is set within the other among the count incrementing period and the count decrementing period, an on time period of any one PWM signal among the first PWM signal, the second PWM signal, and the third PWM signal into given on time periods to thereby add a given divided on time period to the second energizing time period that is less than the threshold such that,
the on time period of the one PWM signal among the first PWM signal, the second PWM signal, and the third PWM signal is adjusted to lengthen the second energizing period in accordance with the given divided on time period, and on time periods of the two remaining PWM signals among the first PWM signal, the second PWM signal, and the third PWM signal are not adjusted.

\* \* \* \* \*